US007399720B1

(12) United States Patent
Brow et al.

(10) Patent No.: US 7,399,720 B1
(45) Date of Patent: Jul. 15, 2008

(54) GLASS AND GLASS-CERAMIC SEALANT COMPOSITIONS

(76) Inventors: Richard K. Brow, 603 Germann Ct., Rolla, MO (US) 65401; Signo Tadeu Dos Reis, 1509 N. Bishop, Apt. #4, Rolla, MO (US) 65401; Glen Benson, 952 57th St., Oakland, CA (US) 94608

( * ) Notice: Subject to any disclaimer, the term of this patent is extended or adjusted under 35 U.S.C. 154(b) by 548 days.

(21) Appl. No.: 10/966,614

(22) Filed: Oct. 15, 2004

(51) Int. Cl.
*C03C 8/14* (2006.01)
*C03C 8/20* (2006.01)

(52) U.S. Cl. ............................ 501/17; 501/18; 501/73; 501/77; 501/79

(58) Field of Classification Search .................. 501/17, 501/18, 73, 77, 79
See application file for complete search history.

(56) References Cited

U.S. PATENT DOCUMENTS 6,430,966 B1 8/2002 Meinhardt et al.
6,532,769 B1 3/2003 Meinhardt et al.
2006/0063659 A1 * 3/2006 Xue et al. .................... 501/15

* cited by examiner

*Primary Examiner*—G. Blackwell
(74) *Attorney, Agent, or Firm*—C. John Brannon; Brannon & Associates PC

(57) ABSTRACT

A glass composition for use as a sealant or otherwise bonded to a fuel cell component, including from about 40 mol % to about 60 mol % RO; from about 2 mol % to about 10 mol % $M_2O_3$; and from about 35 mol % to about 45 mol % $SiO_2$. R is selected from the group including strontium, calcium, magnesium and zinc and combinations thereof. M is selected from the group including aluminum, boron, lanthanum, iron and combinations thereof. The glass includes at least about 5 mol % ZnO. Upon heat treatment, the glass at least partially crystallizes with the formation of at least one alkaline earth-zinc pyrosilicate crystalline phases.

6 Claims, 2 Drawing Sheets

GLASS AND GLASS-CERAMIC SEALANT COMPOSITIONS

TECHNICAL FIELD OF THE INVENTION

The invention relates generally to the field of glass ceramics, and, more particularly, to a glass ceramic sealant material useful for solid oxide fuel cells and a method of making the same.

BACKGROUND OF THE INVENTION

Ceramic materials are finding increasing utility fuel cell applications. Although their inherent resistance to high temperature and chemically corrosive environments are well suited for such applications, there remains the problem of joining and/or sealing separate ceramic elements or joining ceramic and metal components. In the case of solid oxide fuel cells, ceramic electrolytes are useful for oxygen separation and charge transport at high temperatures. However, such electrolytes typically must be sealed to prevent the mixing of the fuel gas and oxidant gas species on either side of the electrolyte. The seal should not only be gas-tight, but is often also used to bond fuel cell components together. Thus, the seal has to be suitable for use in chemically and thermally extreme environments, and must also have thermal expansion characteristics comparable with those of the electrolyte.

Currently, the solid oxide electrolyte material is selected from variations on a few basic compositions. The most commonly chosen basic electrolyte materials are yttria stabilized zirconia, ceria, bismuth oxide and lanthanum gallate. The thermal expansion coefficient (CTE) of these materials can range from about $100\times10^{-7}$ to about $150\times10^{-7}$/degree Celsius, depending on the type and concentration of dopants included therein. Fuel cells are typically operated at temperatures ranging from about 700 degrees Celsius to above 1000 degrees Celsius, depending on the type and configuration of the fuel cell. Accordingly, any sealant composition must have thermal expansion characteristics similar to those of the electrolyte (or other fuel cell components) to which the sealant is applied such that a gas tight seal is maintained at temperatures ranging from the ambient to the maximum fabrication and/or operating temperature of the resultant fuel cell device. Further, it is important that the coated substrate and the sealant not have undesired and detrimental chemical interactions. Moreover, the sealant composition must also be stable at the anticipated fuel cell operating temperature (i.e., 700-1000 degrees Celsius) for extended periods of time (i.e., the desired operating life of the fuel cell, typically about 10,000 hours) in a highly chemically reducing environments.

Various solid oxide fuel cell seal compositions have been attempted and have met with varying degrees of success. Silica, boron, and phosphate base glasses and glass-ceramics have been tried. Phosphate glasses tend to volatilize phosphates that react with the fuel cell anode to form nickel phosphide and zirconiumoxyphosphate. Further, phosphate glasses tend to crystallize to form metaphosphates and/or pyrophosphates, which are not very stabile in a humidified fuel gas at fuel cell operating temperatures.

Primarily borosilicate glasses/glass ceramics have the problem of reacting with humidified hydrogen-rich atmosphere at elevated temperatures to form the gaseous species $B_2(OH)_2$ and $B_2(OH)_3$. Therefore, high boron seals are apt to eventually corrode in a humidified hydrogen environment (common in fuel cell operation) over time.

Silica-based glasses and glass-ceramics fare somewhat better as fuel cell sealant material, but still have drawbacks. Although silica-based glassy materials are typically more chemically stable in a fuel cell operating environment, high-silica content glasses may have coefficients of thermal expansion sufficiently mismatched with fuel cell electrolytes and components that the seals are rapidly degraded with thermal cycling. Many of the silicate-based glasses include a BaO component to give the glass the desired CTE. BaO participates in deleterious interfacial reactions with the chromium-containing interconnect materials commonly found in solid oxide fuel cell devices, producing interfacial reaction products that compromise the mechanical integrity of the seal and/or joint.

At fuel cell operating temperatures, most glasses will crystallize relatively quickly. Thus, it is important that the coefficient of thermal expansion of not only the glass but also of the eventually formed crystallized material be compatible with the solid oxide fuel cell electrolyte. Once the glass is fully crystallized, the resultant crystalline material is typically very stable over time. Further, crystallized glasses tend to exhibit increased mechanical strength at operating temperature, translating to improved seal/joint reliability.

Fuel cell technology is becoming increasingly important as the world demand for traditional hydrocarbon fuels increases and supplies of the same decrease. As the demand for fuel cells increases, so increases the demand for sealant materials with suitable thermal, chemical, and mechanical properties. There remains a need for a sealing material composition that can operate at a temperature of up to about 1000 degrees Celsius, has a thermal expansion between $80\times10^{-7}$ and $130\times10^{-7}$/degree Celsius, and has no detrimental chemical interactions with the fuel cell components. The present invention addresses this need.

SUMMARY OF THE INVENTION

The present invention relates to a glass composition useful for sealing and joining solid oxide fuel cell device components. The glass composition includes between about 45 mol % to about 55 mol % RO; between about 5 mol % to about 10 mol % $M_2O_3$; and between about 40 mol % to about 45 mol % $SiO_2$, where R is selected from the group including strontium, calcium, magnesium and zinc and combinations thereof and M is selected from the group including aluminum, boron, iron and combinations thereof. ZnO is typically present in an amount of at least about 5 mol %.

One object of the present invention is to provide an improved glassy fuel cell sealant composition. Related objects and advantages of the present invention will be apparent from the following description.

DESCRIPTION OF THE PREFERRED EMBODIMENTS

Figure 1:
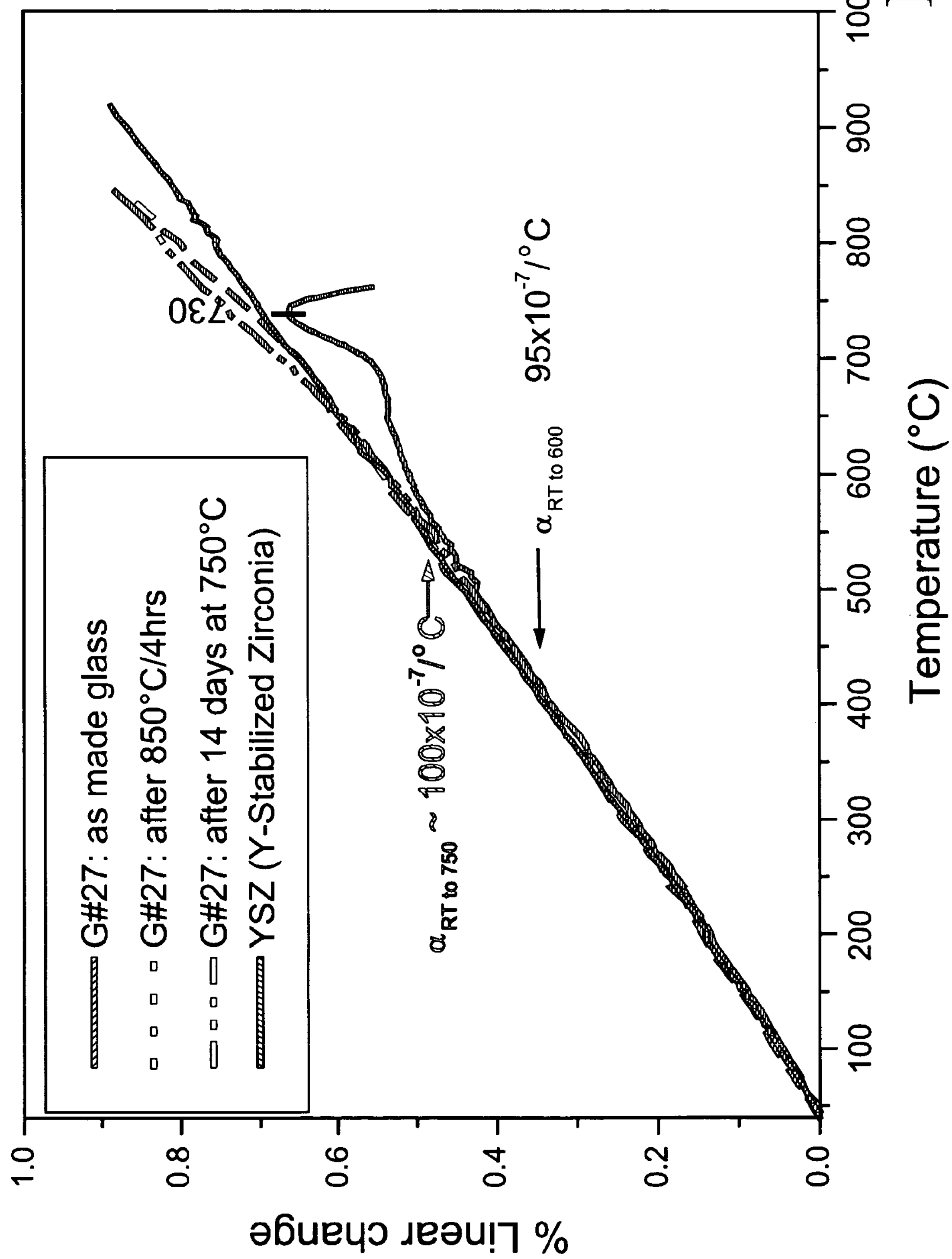
FIG. 1 is a graph of the coefficient of thermal expansion versus temperature in degrees Celsius for a solid electrolyte, a glass and the crystallized phases of a substantially analogous glass ceramic material.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Solid oxide fuel cells (SOFCs) convert the chemical energy released by the combustion of simple fuels to electrical energy by the diffusion of oxygen ions through oxygen electrolytes, such as yttrium-stabilized zirconia (YSZ). SOFCs operate at elevated temperatures (typically exceeding 700 degrees Celsius) in order to achieve optimum operational efficiency. Hermetic seals are typically required for the operation of an SOFC to prevent the mixing of fuel and oxidant gasses outside of the cell stack as well as to prevent leakage of fuel and oxidant within the cell stack. The seals further serve to electrically isolate components of the cell. The requirements for an SOFC hermetic seal are stringent. The seal should remain substantially structurally stable for extended periods under the operational elevated temperature and chemically corrosive environmental conditions of the fuel cell. Also, the seal should be chemically compatible with the other fuel cell materials. Further, the seal should not contribute to the generation of significant stresses on the fuel cell when it is thermally cycled. In general, desirable sealing materials have thermal expansion coefficients (CTEs) that substantially match the CTEs of the fuel cell components (such as that of the YSZ electrolyte, about $100\times10^{-7}/°$ C.)). Finally, the seal should wet and bond to the cell components to be sealed, and should be sealed at a temperature less than the lowest processing temperature for other cell components.

Glasses based on alkaline earth aluminosilicate compositions have been proposed for SOFC seals. These materials have the requisite thermal properties for making rigid hermetic seals to many of the materials used in SOFCs; however, issues concerning long-term, high-temperature compatibility with the fuel cell materials have been raised, particularly for those glass compositions containing barium oxide, which is typically added to increase the sealant CTE to match other the CTE of the SOFC components desired to be sealed.

The present invention relates to a new composition of SOFC sealing glass that affords greater chemical and thermal stability than prior glass compositions used for these applications. The glasses of the present invention are BaO-free alkaline earth-zinc silicates, modified with additives selected from several different oxides, including $B_2O_3$, $Al_2O_3$, and $TiO_2$, to obtain the desired combination of chemical and thermal characteristics. Table 1 lists the molar compositions of a number of exemplary glass compositions of the present invention, and Table 2 lists thermal properties of the exemplary glass compositions of the present invention.

TABLE 1

| Glass | Composition (mol %) | | | | | | | | | | | |
|---|---|---|---|---|---|---|---|---|---|---|---|---|
| ID | SrO | CaO | ZnO | $B_2O_3$ | $Al_2O_3$ | $SiO_2$ | $GeO_2$ | BaO | $TiO_2$ | $ZrO_2$ | $Cr_2O_3$ | $La_2O_3$ |
| 6 | 25.0 | — | 25.0 | — | 10.0 | 40.0 | — | — | — | — | — | — |
| 7 | 27.5 | — | 27.5 | — | 5.0 | 40.0 | — | — | — | — | — | — |
| 16 | 20.0 | 20.0 | 10.0 | 2.0 | 3.0 | 45.0 | — | — | — | — | — | — |
| 18 | 19.6 | 19.6 | 9.8 | 2.0 | 2.9 | 44.1 | — | — | 2.0 | — | — | — |
| 19 | 19.2 | 19.2 | 9.6 | 1.9 | 2.9 | 43.2 | — | — | 4.0 | — | — | — |
| 20 | 16.7 | 16.7 | 16.7 | 2.0 | 3.0 | 45.0 | — | — | | — | — | — |
| 21 | 16.4 | 16.4 | 16.4 | 2.0 | 2.9 | 44.1 | — | — | 2.0 | — | — | — |
| 22 | 16.5 | 16.5 | 16.5 | 2.0 | 3.0 | 44.6 | — | — | 1.0 | — | — | — |
| 23 | 27.5 | — | 27.5 | 2.0 | 3.0 | 40.0 | — | — | | — | — | — |
| 24 | 25.0 | 13.5 | 13.5 | 5.0 | 3.0 | 40.0 | — | — | | — | — | — |
| 25 | 24.5 | 13.2 | 13.2 | 4.9 | 2.9 | 39.2 | — | — | 2.0 | — | — | — |
| 26 | 24.3 | 13.1 | 13.1 | 4.9 | 2.9 | 38.8 | — | — | 3.0 | — | — | — |
| 27 | 18.5 | 19.2 | 13.2 | 1.9 | 2.9 | 42.2 | — | — | 2.0 | — | — | — |
| 28 | 18.5 | 19.2 | 13.2 | 1.9 | 2.9 | 38.2 | 4.0 | — | 2.0 | — | — | — |
| 29 | 20.0 | 20.0 | 10.0 | 2.0 | 3.0 | 43.0 | 2.0 | — | — | — | — | — |
| 30 | 19.6 | 19.6 | 9.8 | 2.0 | 2.9 | 42.1 | 2.0 | — | 2.0 | — | — | — |
| 33 | 18.5 | 19.2 | 13.2 | 1.9 | 2.9 | 42.2 | — | — | — | — | 2.0 | — |
| 37 | — | 26.0 | 26.0 | 4.0 | 2.0 | 42.0 | — | — | — | — | — | — |
| 38 | 26.0 | — | 26.0 | 4.0 | 2.0 | 42.0 | — | — | — | — | — | — |
| 39 | 26.0 | — | 26.0 | 7.0 | 2.0 | 39.0 | — | — | — | — | — | — |
| 40 | 26.0 | 13.0 | 13.0 | 4.0 | 2.0 | 42.0 | — | — | — | — | — | — |
| 41 | 26.0 | — | 26.0 | 2.0 | 2.0 | 44.0 | — | — | | — | — | — |
| 42 | 26.0 | 13.0 | 13.0 | 2.0 | 2.0 | 42.0 | — | — | 2.0 | — | — | — |
| 43 | 18.5 | 19.2 | 13.2 | 1.9 | — | 42.2 | — | — | 2.0 | — | — | 2.9 |

TABLE 2

| | Properties | | | | |
|---|---|---|---|---|---|
| Glass ID | Glass Transition Temperature (° C.) | Softening Temp. (° C.) | Crystallization Temperature (° C.) | Thermal Expansion (Glass, 100-600° C.) ($\times 10^{-7}/°$ C.) | Thermal Expansion (Crystal., RT to 700°) ($\times 10^{-7}/°$ C.) |
| 6 | 716 | 775 | 898 | 79 | 70 |
| 7 | 696 | 775 | 815/920 | 82 | 82 |
| 16 | 720 | 751 | 929 | 100 | 104 |
| 18 | 720 | 755 | 920-940 | 102 | 120-115 |

TABLE 2-continued

| Glass ID | Properties: Glass Transition Temperature (° C.) | Softening Temp. (° C.) | Crystallization Temperature (° C.) | Thermal Expansion (Glass, 100-600° C.) ($\times 10^{-7}$/° C.) | Thermal Expansion (Crystal., RT to 700°) ($\times 10^{-7}$/° C.) |
|---|---|---|---|---|---|
| 19 | 720 | 755 | 908 | 100 | 102 |
| 20 | 700 | 730 | 922 | 86 | 90 |
| 21 | 695 | 732 | 845 | 86 | 88 |
| 22 | 700 | 736 | 911 | 90 | 82 |
| 23 | 690 | 723 | 818-897 | 89 | 91-78 |
| 24 | 681 | 704 | 864 | 93 | 95 |
| 25 | 682 | 717 | 862 | 93 | 94 |
| 27 | 700 | 730 | 904 | 95 | 105 |
| 26 | 688 | 719 | 790-881 | 97 | 97 |
| 28 | 456-705 | 735 | 820-904 | 95 | — |
| 29 | 713 | 704 | 911 | 92 | 100 |
| 30 | 715 | 746 | 890 | 91 | 95 |
| 31 | 698 | 733 | 808-895 | 93 | 85 |
| 33 | 714 | 749 | 914 | 93 | 96 |
| 37 | 649 | 738 | 865-961 | 68 | 75 |
| 38 | 660 | 744 | 910 | 84 | 55 |
| 39 | 649 | 727 | 865 | 92 | 72 |
| 40 | 715 | 744 | 871 | 94 | 104 |
| 41 | 682 | 765 | 913 | 79 | 74 |
| 42 | 702 | 720 | 875 | 100 | 100 |
| 43 | 718 | 738 | 888 | 108 | 108 |

The glass compositions of the present invention generally have lower silica and alumina contents than other glasses developed for SOFC sealing applications and contain no BaO. For example, some prior art glasses generally have >50 mole % $SiO_2$, >10 mole % $Al_2O_3$, and >30 mole % BaO.

In the glasses of the present invention, at least 5 mol % zinc oxide (ZnO) is added to modify the viscosity the new glasses and to reduce the sealing temperatures (typically to less than about 900 degrees Celsius, and, more typically to less than about 850 degrees Celsius). The decrease in the sealing temperature is desired because some SOFC designs employ materials that cannot be exposed to temperatures greater than about 900 degrees Celsius, or even lower. The decreased silica and alumina contents in the glass compositions of the present invention promote the formation of alkaline earth-zinc pyrosilicate crystalline phases, which contribute to the desirable thermal and chemical properties of seals and joints made from the glass/glass-ceramic compositions of the present invention.

The glasses of the present invention are crystallized at the sealing temperature to form glass-ceramics with CTEs in the range ($100–120\times10^{-7}$/° C.) required to sealingly or joiningly bond to many common SOFC materials and remain stable during repeated thermal cycling of the SOFCs and under the SOFC thermal and chemical operating conditions (i.e., at temperatures exceeding about 700 degrees Celsius and under highly alkaline/reducing conditions). For example, FIG. 1 shows CTE curves for glass #27 before and after crystallization as well as the CTE curve for YSZ (a typical SOFC electrolyte material). The close match of the CTEs of the sealing glass and YSZ is highly desirable, because it ensures that the mechanical stresses that would otherwise develop when the SOFC is cycled between room temperature and the operational temperature are minimized. FIG. 1 further shows the CTE curve from the G#27 glass-ceramic after a 14-day isothermal heat treatment during which crystallization of the glass has occurred. The CTE of this crystallized glass has not change appreciably, indicating that the thermo-mechanical properties of an SOFC seal made with this material will not change with operational time.

Figure 2:
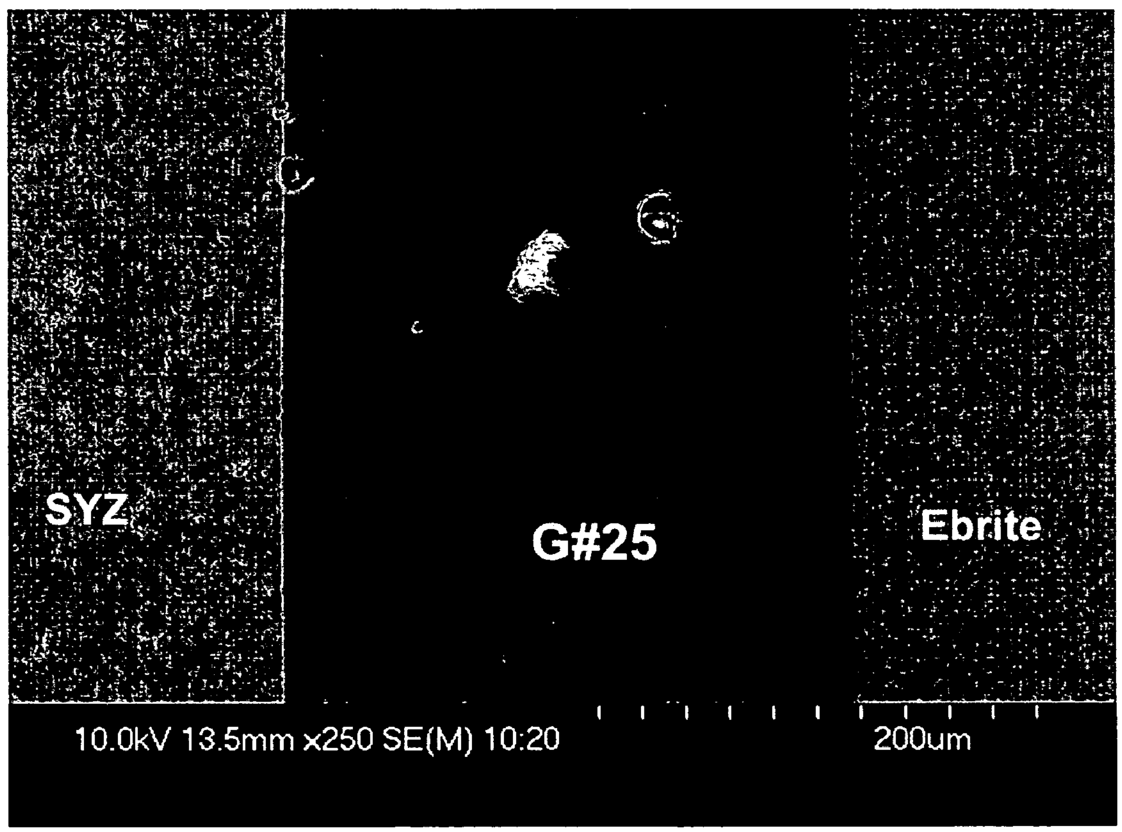
FIG. 2 is a photomicrograph of one embodiment of the present invention, a glassy seal between a ceramic piece and a metal substrate.

The glass composition of the present invention wet and bond to SOFC component materials such as YSZ and Fe/Cr alloys used for fuel cell interconnects. This is illustrated in FIG. 2, a scanning electron photomicrograph of a seal made with a paste of glass #25 powder sealed between YSZ and an Fe/Cr substrate at 850° C. There was observed no formation of deleterious interfacial reaction products after sealing or after subsequent isothermal heat treatments that mimic SOFC operational conditions (e.g., 750° C./28 days). In particular, the compatibility of the glass/glass-ceramic compositions of the present invention at high temperatures with the Fe/Cr interconnect materials appears to be superior to that of other known sealing glass compositions, particularly those including BaO, commonly used for SOFCs.

One embodiment of the present invention includes a joint between at least two solid oxide fuel cell parts. The joint has at least three metal oxides of RO, $M_2O_3$, and $SiO_2$ combined together wherein R is selected from the group consisting of zinc, strontium, calcium, magnesium and combinations thereof. The composition includes at least 5 mol % ZnO. M is selected from the group consisting of aluminum, boron, lanthanum, and iron. The joint substantially matches a coefficient of thermal expansion of the at least two solid ceramic parts. The coefficient of thermal expansion of the joint is from about $80\text{-}150\times10^{-7}$/° C., and, more typically, from about $100\text{-}120\times10^{-7}$/° C., as measured from ambient temperature (about 25 degrees Celsius) to about 700 degrees Celsius.

The relatively low silica and alumina contents of the glass and the addition of zinc oxide yield a glass characterized by a low softening temperature and having a low viscosity above about 850 degrees Celsius and a substantially higher viscosity after crystallization at temperatures below about 800 degrees Celsius. It is desired that fuel cell sealant glasses have relatively low viscosities (typically above about 900 degrees Celsius, more typically above about 850 degrees Celsius), sufficiently low such that the glass may readily flow onto the electrolyte or other fuel cell component substrate. It is also desired that fuel cell sealant glasses have relatively high viscosities at the fuel cell operating temperatures (between about 700 and 800 degrees Celsius) such that the seal is not readily thinned or damaged and/or that any fuel cell joints incorporating the sealants do not become weakened. While the addition of boria (boron oxide, or $B_2O_3$) will also contribute to the desired viscosity characteristics of the sealant glass composition, boria is known to be highly volatile and reactive with the fuel cell materials in humid hydrogen environments when present in even moderate concentrations. Thus, it is desirable to keep boria concentrations less than about 5 mol %, and more desirable to keep boria concentrations less than about 3 mol %.

The glass precursor used to form the seal material typically has a composition that may be expressed as $$RO—M_2O_3—SiO_2$$

wherein the RO is typically present in an amount from about 40 mol % to about 60 mol %, and more typically in the range from about 45 mol % to about 55 mol %, and still more typically wherein RO is present at about 50 mol %; $M_2O_3$ is typically present in an amount from about 2 mol % to about 10 mol % and more typically is present in amounts from about 2 mol % to about 5 mol %; and the $SiO_2$ is typically present in an amount from about 35 mol % to about 45 mol % and is more typically present in an amount of about 40 mol %.

The glass-ceramic compound may further contain at least one additional metal oxide including but not limited to titanium oxide, zirconium oxide and combinations thereof to modify the properties of the glass phase or the final crystallized seal. Such a composition may be expressed as $$X[(RO).(M_2O_3).(SiO_2)]Y(QO_2)$$

wherein X is typically between about 0.95 and about 1.0 and Y is typically between about 0 and about 0.05. Q is typically selected from the group including titanium, zirconium and combinations thereof. As above, R is selected from the group including strontium, calcium, magnesium, zinc and combinations thereof and M is selected from the group including aluminum, boron, lanthanum, iron and combinations thereof. Properties of interest include but are not limited to wetting, glass transition temperature (Tg), glass softening temperature (Ts), thermal expansion coefficient, chemical and thermal stability, and combinations thereof.

The range of thermal expansion coefficients for both glass and crystallized glass-ceramic is typically from about $80\text{-}150\times10^{-7}/°$ C.; more typically, for common fuel cell components of interest, the range of thermal expansion coefficients for both glass-ceramic and crystallized glass-ceramic is from about $100\text{-}120\times10^{-7}/°$ C. The glass transition temperatures (Tg) and softening temperature (Ts) for the glasses are typically in the range of about 650 degrees Celsius to about 800 degrees Celsius. Substantially the same coefficient of thermal expansion is herein defined as the CTE of the seal material within about 20%, preferably within about 10%, more preferably within about 5% of the sealed material.

According to the present invention, a method of joining a first solid ceramic part piece to a second (typically ceramic or metal) piece generally includes the steps of:

(a) providing a powdered glass having a composition of RO, $M_2O_3$, and $SiO_2$ that substantially matches a coefficient of thermal expansion of the first and second pieces, wherein R is selected from the group consisting of strontium, calcium, magnesium and zinc and combinations thereof, and M is selected from the group consisting of aluminum, boron, iron and combinations thereof;

(b) placing the powdered glass at an interface of the first and second pieces as a pre-assembly;

(c) heating the pre-assembly to a temperature sufficient to cause the blend to flow into said interface as an assembly; and (d) cooling the assembly and solidifying said blend thereby joining the at least two ceramic parts.

As detailed above, ZnO is typically present in an amount of at least about 5 mol %. RO is typically present in an amount from about 45 mol % to about 55 mol %, $M_2O_3$ is present in an amount from about 5 mol % to about 10 mol %, and $SiO_2$ is present in an amount from about 40 mol % to about 45 mol %. In the case of an SOFC, the first ceramic piece is typically a YSZ electrolyte substrate and the second piece is typically a Fe/Cr metal interconnect.

Example 1

A glass composition with 27.5 mole percent strontium oxide, 27.5 mole percent zinc oxide, 5 mole percent dialuminum trioxide and 40 mole percent silicon dioxide. The formula may be expressed as follows:

$$27.5SrO.27.5ZnO.5Al_2O_3.40SiO_2$$

A glass formed from this composition was measured to have a glass transition temperature $T_g$ of 696 degrees Celsius, a dilatometric softening point of 737 degrees Celsius, a peak maximum crystallization temperature of 815 degrees Celsius and a CTE of $82\times10^{-7}/°$ C. Glasses with about this composition should have about the same properties as listed above.

Example 2

A glass composition with 25 mole percent strontium oxide, 25 mole percent zinc oxide, 10 mole percent dialuminum trioxide and 40 mole percent silicon dioxide. The formula may be expressed as follows:

$$25SrO.25ZnO.10Al_2O_3.40SiO_2$$

A glass formed from this composition was measured to have a glass transition temperature $T_g$ of 716 degrees Celsius, a dilatometric softening point of 775 degrees Celsius, a peak maximum crystallization temperature of 898 degrees Celsius and a CTE of $82\times10^{-7}/°$ C. Glasses with about this composition should have about the same properties as listed above.

Example 3

A glass composition with 25 mole percent strontium oxide, 25 mole percent zinc oxide, 5 mole percent diferrous trioxide, 5 mole percent dialuminum trioxide and 40 mole percent silicon dioxide. The formula may be expressed as follows:

$$25SrO.25ZnO.5Fe_2O_3.5Al_2O_3.40SiO_2$$

A glass formed from this composition was measured to have a glass transition temperature $T_g$ of 716 degrees Celsius, a dilatometric softening point of 775 degrees Celsius, a peak maximum crystallization temperature of 898 degrees Celsius and a CTE of $82\times10^{-7}/°$ C. Glasses with about this composition should have about the same properties as listed above.

Example 4

A glass composition with 26 mole percent strontium oxide, 13 mole percent calcium oxide, 13 mole percent zinc oxide, 2 mole percent diboron trioxide, 2 mole percent dialuminum trioxide, 42 mole percent silicon dioxide and 2 mole percent titanium dioxide. The formula may be expressed as follows:

$$26SrO.13CaO.13ZnO.2B_2O_3.2Al_2O_3.42SiO_2.2TiO_2$$

A glass formed from this composition was measured to have a glass transition temperature $T_g$ of 702 degrees Celsius, a dilatometric softening point of 720 degrees Celsius, a peak maximum crystallization temperature of 875 degrees Celsius and a CTE of $100\times10^{-7}/^\circ$ C. Glasses with about this composition should have about the same properties as listed above.

Example 5

A glass composition with 18.5 mole percent strontium oxide, 19.2 mole percent calcium oxide, 13.2 mole percent zinc oxide, 1.9 mole percent diboron trioxide, 2.9 mole percent dilanthanum trioxide, 42.2 mole percent silicon dioxide, and 2.0 mole percent titanium dioxide. The formula may be expressed as follows:

$$18.5SrO.19.2CaO.13.2ZnO.1.9B_2O_3.2.9La_2O_3.42.2.0SiO_2.2TiO_2$$

A glass formed from this composition was measured to have a glass transition temperature $T_g$ of 718 degrees Celsius, a dilatometric softening point of 738 degrees Celsius, a peak maximum crystallization temperature of 888 degrees Celsius and a CTE of $108\times10^{-7}/^\circ$ C. Glasses with about this composition should have about the same properties as listed above.

Example 6

A glass composition with 26 mole percent strontium oxide, 13 mole percent calcium oxide, 13 mole percent zinc oxide, 2 mole percent diboron trioxide, 2 mole percent dialuminum trioxide, 42 mole percent silicon dioxide and 2 mole percent titanium dioxide. The formula may be expressed as follows:

$$26SrO.26ZnO.2B_2O_3.2Al_2O_3.44SiO_2$$

A glass formed from this composition was measured to have a glass transition temperature $T_g$ of 682 degrees Celsius, a dilatometric softening point of 765 degrees Celsius, a peak maximum crystallization temperature of 913 degrees Celsius and a CTE of $79\times10^{-7}/^\circ$ C. Glasses with about this composition should have about the same properties as listed above.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A joint between at least two solid oxide fuel cell parts comprising: at least three metal oxides RO, $M_2O_3$, and $SiO_2$ combined together; wherein R is selected from the group consisting of strontium, calcium, magnesium and zinc and combinations thereof; wherein M is selected from the group consisting of aluminum, boron, lanthanum, iron and combinations thereof; wherein the joint substantially matches a coefficient of thermal expansion of at least two solid ceramic parts; wherein the RO is present in an amount from about 40 mol % to about 60 mol %; wherein the $M_2O_3$ is present in an amount from about 2 mol % to about 10 mol %; wherein said $SiO_2$ is present in an amount from about 35 mol % to about 45 mol %; and wherein ZnO is present in an amount of at least about 5 mol %.

2. The joint of claim 1 that is a seal.

3. The joint of claim 1, wherein the coefficient of thermal expansion is from about $80(10^{-7})$ per degree Celsius to about $120(10^{-7})$ per degree Celcius as measured from 25 degrees Celcius to 700 degree Celsius.

4. The joint as recited in claim 1, wherein at least two solid oxide fuel cell parts are an oxygen ion conductor and an interconnect in a solid oxide fuel cell.

5. The joint of claim 1, further comprising at least one additional metal oxide.

6. The joint of claim 5, wherein at least one additional metal oxide is selected from the group consisting of $TIO_2$, $ZrO_2$ and combinations thereof.

* * * * *